(12) United States Patent
Traynor et al.

(10) Patent No.: US 11,804,109 B2
(45) Date of Patent: Oct. 31, 2023

(54) METHOD, APPARATUS, AND SYSTEM FOR DETECTING CARD SKIMMING DEVICES

(71) Applicant: UNIVERSITY OF FLORIDA RESEARCH FOUNDATION, INCORPORATED, Gainesville, FL (US)

(72) Inventors: Patrick G. Traynor, Gainesville, FL (US); Christian Peeters, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 0 days.

(21) Appl. No.: 17/447,092

(22) Filed: Sep. 8, 2021

(65) Prior Publication Data

US 2022/0076543 A1 Mar. 10, 2022

Related U.S. Application Data

(60) Provisional application No. 63/075,926, filed on Sep. 9, 2020.

(51) Int. Cl.
| | | |
|---|---|---|
| G07F 19/00 | (2006.01) | |
| G07F 7/08 | (2006.01) | |
| G06Q 20/32 | (2012.01) | |
| G06K 7/08 | (2006.01) | |
| G06K 19/073 | (2006.01) | |

(52) U.S. Cl.
CPC ......... *G07F 19/2055* (2013.01); *G06K 7/087* (2013.01); *G06K 19/07372* (2013.01); *G06Q 20/3278* (2013.01); *G07F 7/0813* (2013.01)

(58) Field of Classification Search
CPC .................................................. G07F 19/2055
See application file for complete search history.

(56) References Cited

U.S. PATENT DOCUMENTS

2018/0046948 A1* 2/2018 Ray ..................... G07F 19/2055

* cited by examiner

*Primary Examiner* — Rafferty D Kelly
(74) *Attorney, Agent, or Firm* — Alston & Bird LLP

(57) ABSTRACT

Provided herein is a method, apparatus, and system for detecting conditions indicative of an attempt to attach a skimming device to a payment device. Methods may include monitoring at least one wire among a plurality of wires between a card reader device and a motherboard; determining voltage consumption; determining current consumption; identifying a change in voltage consumption or current consumption satisfying a predetermined value; and providing for transmission of an alert of a condition indicating possible attachment of a card skimming device. Methods may include generating a status message periodically and transmitting the status message to a remote entity. The change in voltage consumption or current consumption satisfying the predetermined value may include a voltage instability exceeding a predetermined range about an anticipated voltage. The change in voltage consumption or current consumption satisfying the predetermined value may include a decrease in current satisfying the predetermined value.

20 Claims, 5 Drawing Sheets

METHOD, APPARATUS, AND SYSTEM FOR DETECTING CARD SKIMMING DEVICES

CROSS-REFERENCE TO RELATED APPLICATIONS

This application claims priority to U.S. Provisional Patent Application Ser. No. 63/075,926, filed on Sep. 9, 2020, the contents of which are hereby incorporated by reference in their entirety.

TECHNOLOGICAL FIELD

An example embodiment of the present disclosure relates to a method, apparatus, and system for detecting conditions indicative of an attempt to attach a skimming device to a payment device, and more particularly, to a method, apparatus, and system to use signals between a payment card reader and a motherboard containing payment processing circuitry to detect conditions indicative of an attempt to attach a card skimming device to the payment device.

BACKGROUND

Electronic commercial transactions using magnetic stripe cards, such as credit cards and debit cards, have enabled consumers to access financial assets and lines of credit instantaneously in remote locations. However, the rise of electronic transactions has brought new dangers to the safeguarding of financial and personal data. Adversaries can fabricate credit card skimmers that have or maintain the appearance of legitimate card readers to avoid detection. Credit card skimmers can be located at gas stations, supermarkets, and financial institutions. New methods and devices are required to secure personal and financial information from being stolen or replicated.

The vulnerability of kiosks including payment devices such as gas station pumps renders them targets for adversaries endeavoring to deploy card skimming devices. The ability of an adversary to drive to a fuel pump that is unattended and have time to attach a skimming device provides ample opportunity for an adversary to attach such skimming devices with relatively little chance of being caught. Further, the ability to detect these skimming devices is low, particularly to a consumer who is using the payment device to which a skimming device is attached.

BRIEF SUMMARY

Embodiments of the present disclosure provide a method, apparatus, and system for detecting conditions indicative of an attempt to attach a skimming device to a payment device, and more particularly, to a method, apparatus, and system to use signals between a payment card reader and a motherboard containing payment processing circuitry to detect conditions indicative of an attempt to attach a card skimming device to the payment device. It should be understood that the examples and embodiments described herein are for illustrative purposes only and that various modifications or changes in light thereof will be suggested to persons skilled in the art and are to be included within the spirit and purview of this application.

According to an example embodiment, a device for detecting card skimming devices is provided including: a first terminal configured to connect to a voltage wire between a payment card reader and a motherboard containing payment card reading circuitry; a second terminal configured to connect to a ground wire between the payment card reader and the motherboard; a controller configured to monitor voltage and/or current between the voltage wire and the ground wire, where the controller is configured to generate an alert in response to identifying at least one condition indicative of an attempt to attach a card skimming device at the payment card reader or between the payment card reader and the motherboard; and a communication module configured to transmit the alert to a remote entity.

The controller of some embodiments may be configured to generate a status message periodically, where the communication module is configured to transmit the status message to the remote entity. According to some embodiments, the at least one condition indicative of an attempt to attach a card skimming device at the payment card reader or between the payment card reader and the motherboard may include voltage instability exceeding a predetermined range about an anticipated voltage. The at least one condition indicative of an attempt to attach a card skimming device at the payment card reader or between the payment card reader and the motherboard includes a decrease in current satisfying a predetermined value. According to an example embodiment, at least one of the payment card reader and the motherboard are disabled in response to the alert, where the payment card reader and the motherboard do not process payment in response to being disabled. Embodiments optionally include a visual alert to provide a visual indicator to potential users of the payment card reader.

Embodiments may provide a method for detecting card skimming devices including: monitoring at least one wire among a plurality of wires between a card reader device and a motherboard; determining voltage consumption; determining current consumption; identifying a change in voltage consumption or current consumption satisfying a predetermined value; and providing for transmission of an alert of a condition indicating possible attachment of a card skimming device. Methods may include generating a status message periodically and transmitting the status message to a remote entity. The change in voltage consumption or current consumption satisfying the predetermined value may include a voltage instability exceeding a predetermined range about an anticipated voltage. The change in voltage consumption or current consumption satisfying the predetermined value may include a decrease in current satisfying the predetermined value. Methods optionally include disabling at least one of the card reader device and the motherboard in response to the condition indicating possible attachment of a card skimming device. According to some embodiments, the method includes providing a visual alert to potential users of the card reader device alerting the potential users of the condition indicating possible attachment of a card skimming device.

Embodiments provided herein may include a system for detecting card skimming devices including: a card reader; a motherboard including circuitry for processing payment information; a cable including a plurality of wires connecting the card reader to the motherboard; and a tripwire device connected to at least two of the plurality of wires connecting the card reader to the motherboard, where the tripwire device includes a controller configured to identify a condition from at least one of the at least two of the plurality of wires indicative of a possible attachment of a card skimming device. The tripwire device may include a communications module configured to transmit an alert indicative of the possible attachment of the card skimming device to a remote entity. The communications module may be further configured to transmit a periodic status update to the remote entity. At least one condition indicative of the possible attachment of a card skimming device may include voltage instability exceeding a predetermined range about an anticipated voltage. The at least one condition indicative of the possible attachment of a card skimming device may include a decrease in current satisfying a predetermined value.

Embodiments provided herein may include a system for detecting card skimming devices, the system including: a hub; and a card skimming detection device, the card skimming detection device including: a first terminal configured to connect to a voltage wire between a payment card reader and a motherboard containing payment card reading circuitry; a second terminal configured to connect to a ground wire between the payment card reader and the motherboard; a controller configured to monitor voltage and/or current between the voltage wire and the ground wire, where the controller is configured to generate an alert in response to identifying at least one condition indicative of an attempt to attach a card skimming device at the payment card reader or between the payment card reader and the motherboard; and a communication module configured to transmit the alert to the hub, wherein the hub communicates the alert to a service provider. According to some embodiments, the card skimming detection device is one of a plurality of card skimming detection devices, where each of the plurality of card skimming detection devices are in communication with the hub via a short range communication protocol. According to some embodiments, at least one of the payment card reader and the motherboard are disabled in response to the alert, where the payment card reader and the motherboard do not process payment in response to being disabled. The system of some embodiments includes a visual alert to provide a visual indicator to potential users of the payment card reader. The visual alert includes, in some embodiments, a Light Emitting Diode (LED).

DETAILED DESCRIPTION

Figure 1:
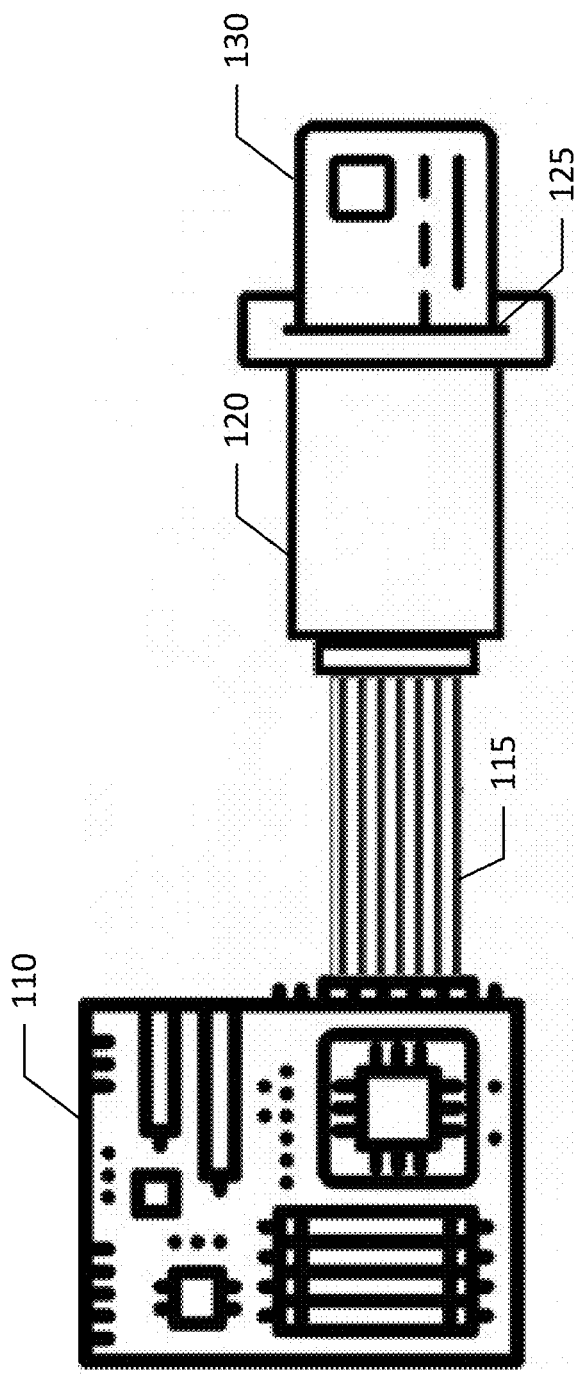
FIG. 1 depicts images of device components according to an embodiment of the present disclosure.
Figure 2:
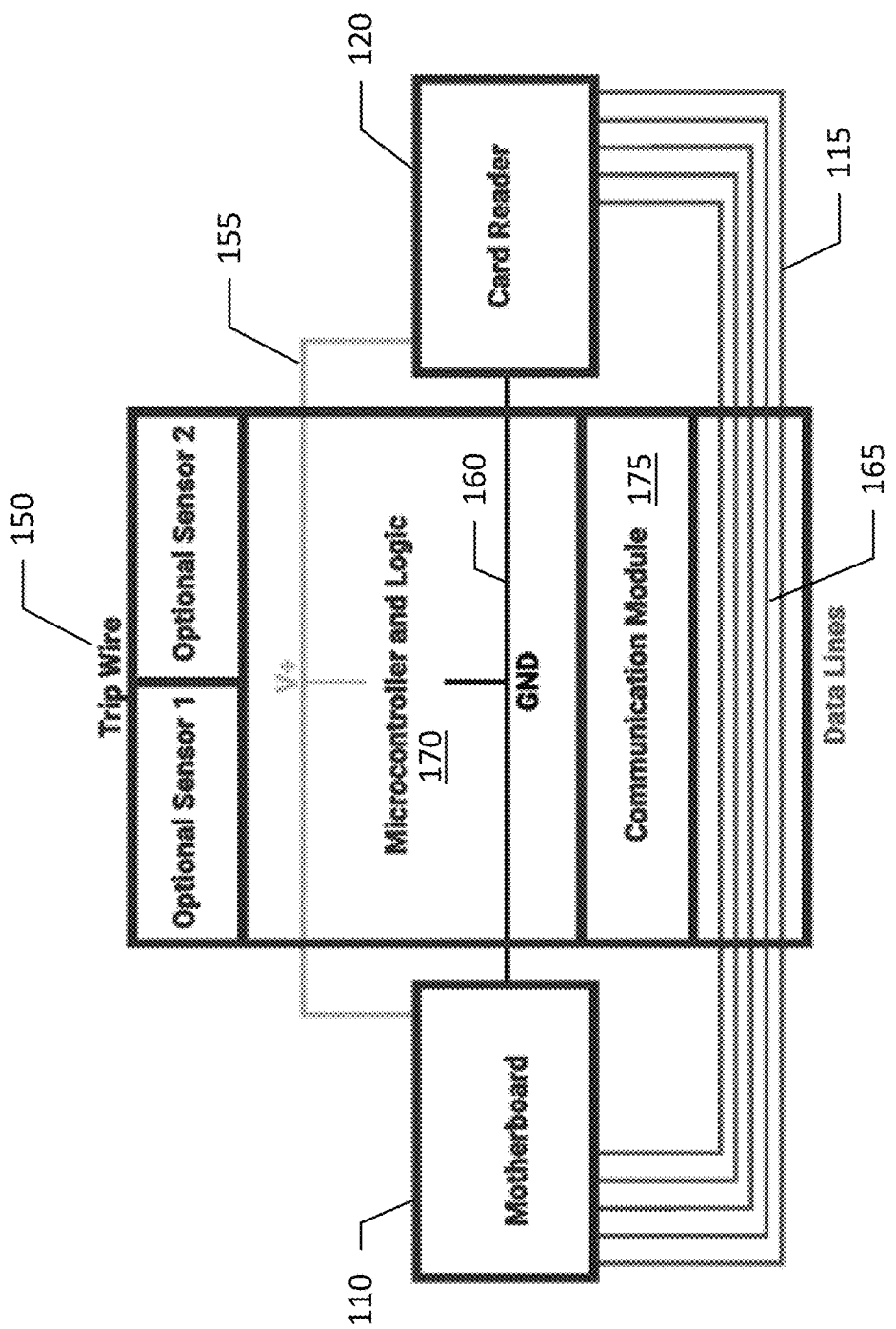
FIG. 2 illustrates a tripwire or detecting a condition indicative of an attempt to attach a card skimming device to a payment device disposed between a card reader and a motherboard according to an example embodiment of the present disclosure.

Some example embodiments of the present disclosure will now be described more fully hereinafter with reference to the accompanying drawings, in which some, but not all embodiments of the invention are shown. Indeed, various embodiments of the disclosure may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Embodiments of the present disclosure include methods and devices for detecting conditions associated with attempts to attach card skimming devices to a payment device. While embodiments described herein may be employed in various applications, embodiments may be particularly useful for credit card payment terminals that may be unattended or seldom attended providing opportunity for tampering. One such example is fuel stations. Fuel stations support critical government, commercial, and personal activities. Whether the fuel is gasoline, hydrogen, propane, compressed natural gas (CNG), or electric charging, such stations represent one of the most visible components of national critical infrastructure. Dispensing devices such as pumps are complex systems that accurately meter fuel and facilitate payment for the metered and dispensed fuel. As these pumps are largely unattended, and given the complex competing interests of economics and security, these pumps have become targets for adversaries who may affix credit card skimmers inside or on the surface of the payment component of the pumps. The damage of such fraud may be double in this industry as adversaries may return to steal fuel using the cards they have previously captured and copied. Such attacks are possible as pump internals and credit card readers may be susceptible to tampering without reliable tools for detection.

Embodiments described herein focus on the unique and significant challenges of securing payment terminals such as those used in fuel dispensing devices. Embodiments employ a "tripwire" that captures the electrical continuity between a housing such as a fuel pump and a card reader.

Electronic payment through contactless payment and credit card payment has largely replaced conventional cash payment in many sectors of the economy. This shift is across retail establishments, and is evident particularly in the fuel services industry where nearly 75% of customers never go inside a gas station due to pay-at-the-pump availability through a payment device attached to the pump. The ease of pay-at-the-pump has not only improved convenience, but has lead to significantly lower operating costs for fuel stations as pay-at-the-pump does not require staffing.

The unattended nature of pay-at-the-pump has also created significant opportunities for fraud. Most prevalent and well-known is credit card skimming, where an adversary attaches a small embedded device to the payment device at the fuel pump and captures a copy of a victim's payment card information. Skimmers take multiple possible forms across all industries and have become smaller as technology improves, reducing their detectability. In the fuel services industry, skimmers predominantly take the form of 'internal' skimmers. Whether able to bypass poor protections such as weak locks or assisted by rogue station attendants, attackers can hide their skimmers within the pump payment device internals, rendering them difficult to detect from the exterior. Existing methods of detecting signals emitted by a skimmer, such as a Bluetooth signal can be easily thwarted by changing the communication method, for example.

Embodiments provided herein focus on the critical steps an attacker must take in order to deploy an internal skimmer. Specifically, an attacker must intercept payment card information either by replacing the cable connecting a card reader to the motherboard, tapping into the wires of the cable connecting the card reader to the motherboard (colloquially known as "vampire tapping" the cable), or simply replacing/modifying the payment card reader with hardware the adversary controls. Unlike prior systems that measure an artifact that may or may not be related but is not a requirement for a successful attack (e.g., pump door alarms fail as there are numerous legitimate reasons for pumps to be accessed, Bluetooth scanners fail as skimmers can hide themselves or use cellular radios), embodiments described herein focus on internal components that no part should touch without notification of an individual or team responsible for the security of the payment device.

Embodiments of the present disclosure provide an apparatus, method, and system to detect different scenarios by which an attacker may deploy a skimmer device to a payment device, such as at a fuel pump, by monitoring electrical continuity and distortion in known components. Embodiments not only indicate normal operations, but will also explicitly indicate problematic conditions in a robust, timely, and efficient manner.

Payment card skimmers may cause significant loss to financial institutions, the fuel services industry, and consumers. Moreover, when stolen card data is used to purchase fuel illicitly, such fuel may be used to fund criminal organizations or exported to embargoed nations. Current defenses either demonstrably fail given the regular false alerting of door alarms or are too expensive to see widespread adoption.

The most accessible and attacked function in the retail environment is the payment system, where electronic systems account for over half of all payments in the United States. The development of secure electronic payment systems falls largely into two categories. Token-based systems are like cash—value is transferred directly between parties as part of the transaction. Token-based systems such as NetCash, DigiCash/Ecash, Millicent, Mondex, and Chipper/Chipknip do not rely heavily on intermediaries. As a result, revocation and counterfeit currency detection are difficult to perform, restricting consumer and retailer trust and limiting their adoption. Account-based electronic payment systems use accounts to store the value with an intermediate (e.g., banks) to process payments between the consumer and the retailer. These system may rely on an online system to verify and authorize transactions. In the US, both of these methods have failed to achieve the level of success of the ubiquitous credit/debit card system, where transaction authorizations are backed by a bank account or credit account.

Consumer trust is the ultimate arbiter by which payment systems succeed. When the confidentiality, availability, or integrity of the payment system does not meet the consumer's expectation, trust drops and the consumer will seek alternate means of payment. As a result, maintaining the security of the payment system is paramount to its success. Accordingly, electronic payment systems must protect against a wide range of attacks, including transaction snooping, fraudulent accounts, counterfeit/tampered transactions, and double spending. With the continued use of the inexpensive magnetic stripe card for credit card, debit card, and gift card transactions, counterfeit payment cards remain a substantial issue. The magnetic stripe does not offer any security features and as a result, its data is easy to copy. Data stolen or obtained via the Internet can be used to create counterfeit cards for use in a physical store or at a payment device, such as one attached to a fuel pump. While magnetic stripes can be fingerprinted at manufacture and checked at use, this requires both the card producer and merchant to implement the solution. Such solutions do nothing for billions of dollars of already-issued unspent gift card balances which merchants are often prevented by law from expiring.

The banking industry is deploying EMV (Europay, MasterCard, and Visa—also known as "chip-and-PIN") to eliminate the problem of counterfeit payment cards. While the security features of EMV-chipped portion of the card offer more protection than magnetic stripes, they have proven vulnerable to attacks including stripe-only cloning, relay attacks, PIN bypass, and replay attacks. Adoption of this technology has been slow and the cost of retrofitting payment devices such as those at gas stations is high. Further, some retailers have deployed payment devices that are EMV capable, but do not activate the EMV using instead the magnetic stripe reader based on customer feedback and backlash due to extended transaction times. Further, the hardware used to process both magnetic stripe and EMV transactions can be tampered with leading to large retail breaches.

The goal of an adversary is to capture credit/debit/gift card information by placing a skimmer inside a payment device or inside a kiosk such as a fuel pump with a payment device. FIG. 1 provides an overview of a payment device that may be incorporated into a fuel pump, for example. As shown, the payment device includes a motherboard 110, a card reader 120 attached to the motherboard 110 with ribbon cable 115, where a slot 125 is defined in the card reader 120 for receiving a payment card 130 in the form of a credit, debit, or gift card. Adversaries may incorporate skimmers into the payment device through various tactics. One tactic is replacement cables where a cable with embedded logic is used to replace the ribbon cable 115. Such a tactic would require access to the inside of the fuel pump. Vampire skimmers employ a connector with a plurality of pins that are positioned to puncture the various wires of the ribbon cable 115 to intercept or read data transmitted along the ribbon cable. These devices also require access to the inside of the fuel pump. Another tactic is replacement of the card reader 120 or insertion of a device to read the payment card as it is inserted into the slot 125 of the card reader. Many of these latter devices do not require access to the inside of the fuel pump rendering them more easily installed. A successful detection system must defend against both unauthorized users and rogue employees (insiders). Unauthorized users take advantage of poor locks or otherwise access the inside of a fuel pump to access the payment device. Rogue employees may work directly with skimming teams or sell their keys to allow internal access to the pumps.

Current mitigation strategies fall into two general categories: prevent/detect the pump from being opened; and prevent card data from being extracted using 'secure card readers'. In the case of the former, the primary examples are the use of either high-security locks or door alarms. For the latter, gas stations can deploy card readers that encrypt the contents of a magnetic stripe at the card reader 120 before passing the data across the ribbon cable 115 to the motherboard 110, or employ EMV. Preventing or detecting access to the pump may be difficult as even in the presence of high-security locks, attackers may pry their way into pumps or obtain keys. Further, as there are many legitimate reasons for accessing the pumps, door alarms are generally prone to high false alarms and often disabled. Encrypted card data protection techniques may fail based on the type of card skimmers deployed and the lack of widespread adoption of EMV payment devices.

Embodiments described herein provide a method, apparatus, and system to defend against card skimming through comprehensive detection, reliable alerting, secure and efficient communications, and being readily deployable. Comprehensive detection involves detecting when any of the most common types of skimmers are put in place. Reliable alerting involves alerting parties who are unlikely to be insiders (e.g., regional managers, corporate security operation centers, law enforcement, etc.) and a low false positive rate. Embodiments employ secure and efficient communications as they send reliable, high-integrity messages with low overhead. Embodiments are deployable as they are relatively simple and low cost, improving the likelihood of adoption.

There are many normal circumstances in which a fuel pump may need to be accessed. Whether for inspections by the state, regular safety checks by an attendant, or a variety of other business and regulatory reasons. However, there exists no legitimate reason for anyone to disturb the connection between the pump motherboard 110 and the payment card reader 120. Detecting such disturbances represents a significant signal indicating that someone was attempting to intercept payment information.

Conventionally, the cable 115 (e.g., a ribbon cable or multi-wire cable) attaching the motherboard 110 and the payment card reader 120 is a passive device, simply attaching the two interfaces via a connection that is often an RS232 7-PIN ribbon interface. A relatively common internal skimmer replaces this cable with a malicious device. From the perspective of an attacker, deploying this device is relatively simple once the pump is accessed and requires no technical sophistication other than simply unplugging the current connector and replacing it with the skimming cable. Because these ribbon cables 115 are tightly connected, the condition of a card reader being unplugged indicates with a very high likelihood that a skimmer is being detected. Embodiments described herein provide a 'tripwire' to detect tampering with the ribbon cable 115 by acting as an active cable between the motherboard 110 and the card reader 120. The tripwire monitors the voltage and ground connections for both stable voltage and current consumption, while providing a pass through for all other pins. If conditions such as significant voltage instability or large drop in current consumption are detected, a flag is thrown by the tripwire and an alert is provided to a user (e.g., regional manager, corporate security, etc.) regarding the detected issue. The disclosed device can provide an easy-to-install skimmer detector and would not require updates to any other hardware or software of the motherboard 110 or the card reader 120.

According to example embodiments described herein, the tripwire will not act as a card skimmer as this would render it an attractive target for compromise. Instead, logic of the tripwire focuses on the data passing through to protect the system by monitoring analog/power signals as appropriate. The tripwire of example embodiments will detect unplugging of the ribbon cable 115 at either end as doing so may direct forensic teams to the type of skimmer being installed. For example, if the ribbon cable 115 is unplugged from the payment card reader 120 there is an indication that the card reader has been replaced and the card reader may be compromised. The tripwire monitors a range of voltages as commercial off-the-shelf card readers operate on a range of voltages, such as five to twenty volts of direct current. Embodiments of the present disclosure monitor these values and detect subtle changes to defend against an adversary.

Figure 3:
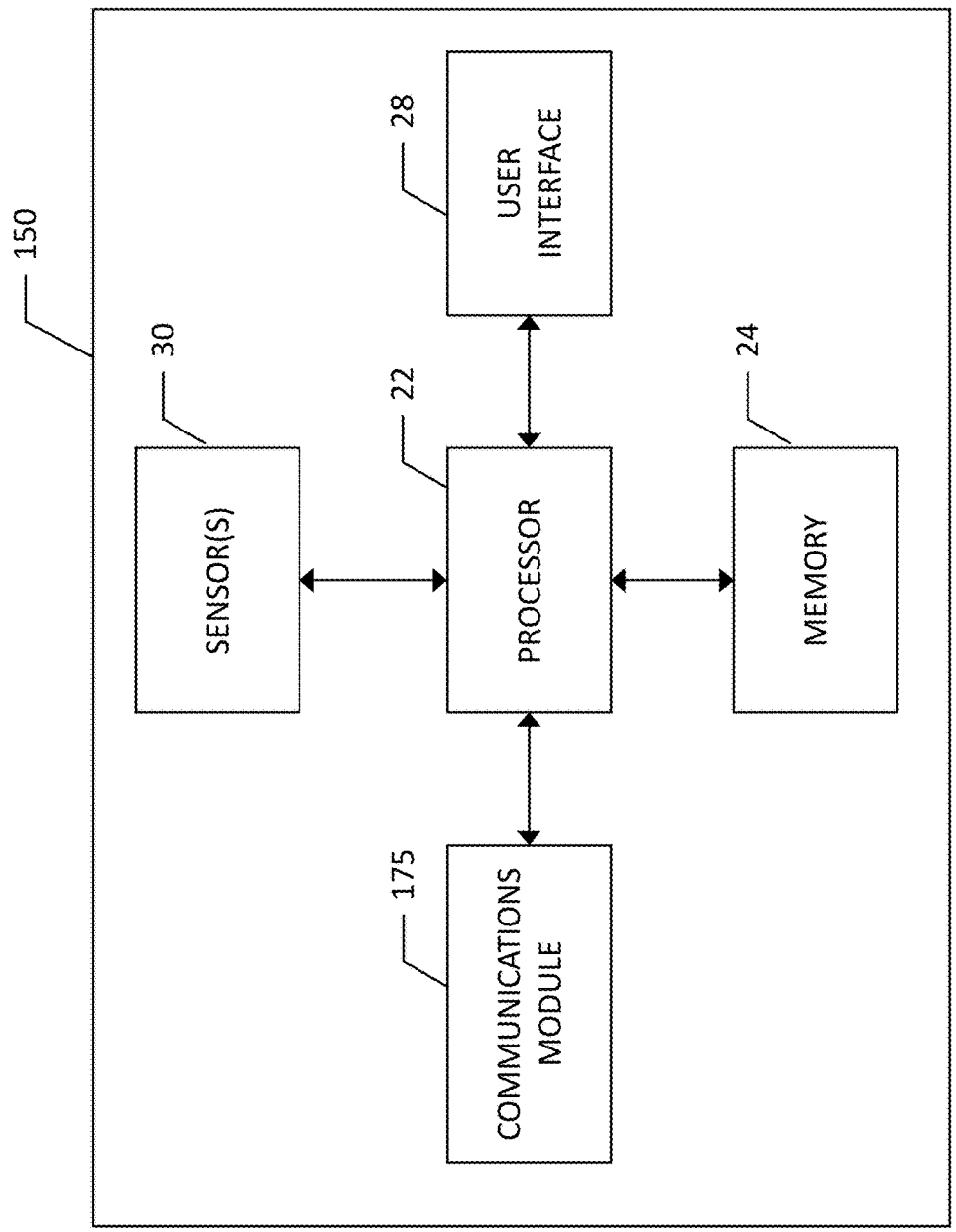
FIG. 3 illustrates a block diagram of components of the tripwire or detecting a condition indicative of an attempt to attach a card skimming device to a payment device according to an example embodiment of the present disclosure.

A schematic diagram of an example embodiment of a tripwire 150 is shown in FIG. 3 including the motherboard 110 and the card reader 120 connected by the ribbon cable 115. As shown, the tripwire 150 may receive a power signal along line 155 of the ribbon cable 115 and share a common ground 160 with the ribbon cable 115. The data lines 165 of the ribbon cable 115 may pass through the tripwire or pass outside of the tripwire. The microcontroller and logic 170 may monitor the signals of wires of the ribbon cable as described herein to detect activity that should result in an alert. The communications module 175 may be configured to provide the alert to a user such as a manager or security office.

The tripwire 150 may be embodied in a number of different ways, particularly with respect to the microcontroller and logic 170. FIG. 3 illustrates a schematic diagram of an example tripwire 150 that may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device 24 may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the tripwire 150 to carry out various functions in accordance with an example embodiment of the present invention. For example, the memory device 24 could be configured to buffer input data for processing by the processor 22. Additionally or alternatively, the memory device could be configured to store instructions for execution by the processor.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading. The processor may be embodied as an ARM M microcontroller having custom bootloader protection for the firmware from malicious modification in addition to allowing for potential firmware updates.

In an example embodiment, the processor 22 may be configured to execute instructions stored in the memory device 24 or otherwise accessible to the processor 22. Alternatively or additionally, the processor 22 may be configured to execute hard coded functionality. As such, whether configured by hardware or software methods, or by a combination thereof, the processor 22 may represent an entity (e.g., physically embodied in circuitry) capable of performing operations according to an embodiment of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the algorithms and/or operations described herein when the instructions are executed. However, in some cases, the processor 22 may be a processor of a specific device (e.g., a head-mounted display) configured to employ an embodiment of the present invention by further configuration of the processor 22 by instructions for performing the algorithms and/or operations described herein. The processor 22 may include, among other things, a clock, an arithmetic logic unit (ALU) and logic gates configured to support operation of the processor 22. In one embodiment, the processor 22 may also include user interface circuitry configured to control at least some functions of one or more elements of the user interface 28.

Meanwhile, the communication interface 26 may include various components, such as a device or circuitry embodied in either hardware or a combination of hardware and software that is configured to receive and/or transmit data such as an alert from the tripwire 150 to a network, a server, or a particular user device of a regional manager or security team, for example. In this regard, the communication interface 26 may include, for example, an antenna (or multiple antennas) and supporting hardware and/or software for enabling communications wirelessly. Additionally or alternatively, the communication interface 26 may include the circuitry for interacting with the antenna(s) to cause transmission of signals via the antenna(s) or to handle receipt of signals received via the antenna(s). For example, the communications module 175 may be configured to communicate wirelessly with a head-mounted display, such as via Wi-Fi (e.g., vehicular Wi-Fi standard 802.11p), Bluetooth, mobile communications standards (e.g., 3G, 4G, or 5G) or other wireless communications techniques. In some instances, the communication interface 26 may alternatively or also support wired communication, which may communicate with a separate transmitting device (not shown). As such, for example, the communication interface 26 may include a communication modem and/or other hardware/software for supporting communication via cable, digital subscriber line (DSL), universal serial bus (USB) or other mechanisms. For example, the communication interface 26 may be configured to communicate via wired communication with other components of a computing device. While the communications module 175 may be configured to provide alerts to remote users, the communications module may also be configured to detect signals transmitted along the ribbon cable 115. For example, the communications module 175 may be augmented to support a 7-PIN RS232 connector.

The user interface 28 may be in communication with the processor 22, such as the user interface circuitry, to receive an indication of a user input and/or to provide an audible, visual, mechanical, or other output to a user. As such, the user interface 28 may include, for example, one or more buttons, light-emitting diodes (LEDs), a display, a speaker, and/or other input/output mechanisms. The user interface 28 may also be in communication with the memory 24 and/or the communication interface 26, such as via a bus.

The communication interface 26 may facilitate communication between the tripwire 150 and various other devices, networks, or servers. The communications module 175 may be capable of operating in accordance with various first generation (1G), second generation (2G), 2.5G, third-generation (3G) communication protocols, fourth-generation (4G) communication protocols, fifth-generation (5G) communication protocols, Internet Protocol Multimedia Subsystem (IMS) communication protocols (e.g., session initiation protocol (SIP)), and/or the like. For example, a mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like.

The tripwire may optionally include one or more sensors 30, such as a motion sensor, an image capture sensor, light sensor, proximity sensor, etc. The sensors may be configured to detect environmental conditions that signify tampering or opening of the kiosk or pump in which the payment device is enclosed.

While the aforementioned tripwire 150 is described as being configured to detect stand-alone attacks from adversaries attempting to disconnect, replace, or otherwise tamper with the communication between the motherboard 110 and the card reader 120, embodiments also are configured to detect puncture attacks or 'vampire taps'. Many early forms of networking required the use of vampire taps for connectivity. That is, having deployed cabling throughout an area, IT (information technology) staff would then deploy small devices that clamped and pierced these cables to provide a terminal access to the network. This technology has largely been eliminated from this use for multiple reasons. Vampire taps could be challenging to place correctly, rendering signals (and therefore throughput) low. A single mistake in a cable, where 10BASE5 ethernet could support up to 100 clients simultaneously, could potentially force that cable to be replaced and all connections re-tapped while client connectivity was lost. Some of the earliest skimming devices used the same technology of vampire taps. Attackers would install these skimmers by clipping them directly to the RS232 ribbon cables 115 connecting the motherboard 110 to the card reader 120. However, as such clamps may cause the cable to fail, such skimming devices may not work as expected or were detected early through a failure mode. While vampire tap skimming devices may be less desirable, implementing the tripwire disclosed herein to identify any unplugging of the ribbon cable 115 may cause adversaries to revert to vampire taps. As such, embodiments described herein defend against these legacy type attacks.

Embodiments described herein detect significant variation in the signal quality due to the presence of a vampire skimmer. The voltage delivered over a ribbon cable may vary as described above depending upon the requirements of an associated card reader. Embodiments described herein regulate the input voltage for observation while also not removing artifacts that can manifest by the execution of the attack itself. Embodiments may employ voltage regulating integrated circuits. Further, as vampire taps will generally break the shielding between individual lines of the ribbon cable and the grounded shielding or between the lines themselves, vampire tap skimmers are likely to introduce a substantial increase in signal noise. By monitoring voltage including voltage drops and spikes, and by monitoring signal noise, embodiments described herein provide a tripwire that can identify when a vampire tap skimmer is installed along a ribbon cable.

Another common form of internal skimmer attack involves the payment card reader itself. Attacking the reader has a number of advantages for the adversary. If an adversary is unable to access the internals of the kiosk or pump, they may be able to physically extract existing card readers out of the enclosure without specialty tools. Further, replacing a card reader or its logic with one controlled by an adversary rarely provides the visual clues that the cable replacement-style attacks do, rendering this type of attack particularly difficult to detect. For these reasons, this type of skimmer is increasingly popular. A card reader may be replaced or modified to include additional circuitry such as a second logic board to skim payment card data from a payment card as it is ready by the payment card reader. Embodiments described herein can detect the presence of a second logic board based on changes to the voltage observed by the tripwire 150.

While embodiments of the tripwire described herein detect attempts to install internal skimmers in payment devices, such embodiments further report the attempts to parties who can appropriately respond. As a threat model identifies rogue employees at gas stations as a realistic adversary, alerts regarding detected skimmers may need to be transmitted offsite. Providing an application-layer protocol and the proper configuration of supporting protocols throughout the stack network enables alerts to be provided to the appropriate personnel in a timely manner. Alerts may optionally include disabling the payment device until such time as the payment device can be inspected and reset if no skimming device is present, or a skimming device is removed and the payment device reset. Further, embodiments may include a visual alert at the payment device that can alert a potential user of the payment device of the potential presence of a card skimmer device. This alert can be, for example, a Light Emitting Diode (LED) that catches the attention of a potential user.

The method, apparatus, and system described herein implement an application layer protocol to allow a deployed tripwire to provide status updates. Such a protocol may enable three specific conditions: explicit alarms, benign status updates, and implicit alarms. In the case of explicit alarms, an adversary attempting to install a skimmer causes the tripwire to alarm and the type of skimmer attack may also be reported with the alarm. Benign status updates may transmit status messages to a server to indicate to network operators that the tripwire is still functioning appropriately. A lack of status messages may trigger an implicit alarm indicates that the tripwire has not been heard from within a predefined period of time, suggesting an issue with the tripwire. Messaging may be conducted over secure communications such as transport layer security (TLS, e.g., TLS 1.2) with certificate pinning and Client Certificate Authentication (CCA).

Depending upon the mode of communication of the alerts and status messages, a communications module 175 may be expensive. For instance, if each tripwire communicated via cellular signal, each tripwire would require an individual SIM (Subscriber Identity Module) card. As such, embodiments may provide a system by which multiple tripwires of an establishment may be networked to eliminate the need for individual cellular radios in each tripwire. For example, each tripwire may include a near-field communication protocol such as Bluetooth or 802.11 WiFi.

Figure 4:
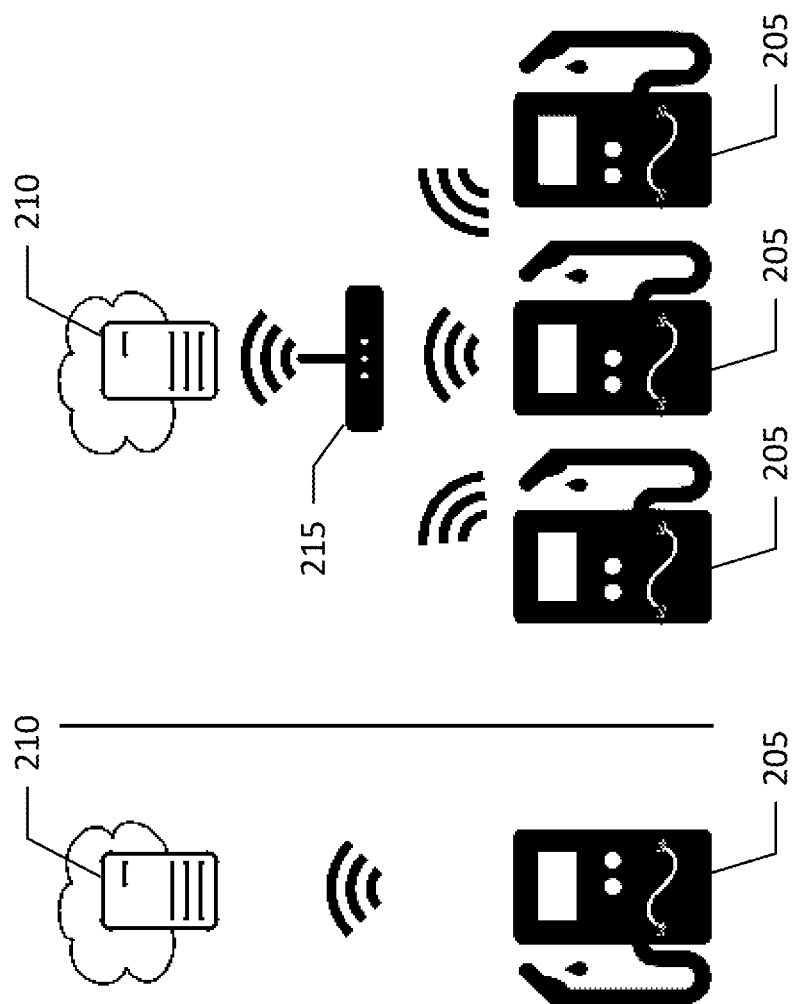
FIG. 4 illustrates two example systems for deploying tripwires in the field according to an example embodiment of the present disclosure.

Embodiments of the present disclosure may include different configurations as illustrated in FIG. 4 where a first configuration includes a tripwire at a fuel pump 205 in communication with a server 210, and a second configuration with a hub 215 in communication with a plurality of tripwires at fuel pumps 205, where the hub 215 is in communication with a server 210. Embodiments employing a hub may benefit from using lower-cost near-field communication systems to each communicate individually with the hub 215, while the hub communicates via a signal such as a cellular signal to communicate alerts and status messages for a plurality of fuel pumps 205 to a server 210. Such an embodiment may reduce the cost to implement the tripwire described herein and increase adoption rates.

To further increase adoption, and as service stations are unlikely to have IT staff at each station location, a hub 215 and a plurality of tripwires 150 may be paired before being provided to a customer (i.e., a service station). This may allow for a plug-and-play with minimal technical ability of an employee.

Data from multiple tripwires may be aggregated at a hub and sent over cellular signal to a server for status updates. Included with such aggregation may be a proof of participation cryptographic token which may be generated with a private key associated with each tripwire. This precludes a compromised hub from falsely reporting values on behalf of an uncompromised tripwire.

Embodiments described herein defend against a variety of internally placed payment card skimming devices in payment kiosks such as those integrated with fuel pumps. Existing solutions are limited and generally focus on detecting extremely customized configurations (e.g., the presence of a specific Bluetooth radio with a specific identifier) or fail to provide sufficient return on investment (e.g., replacement costs of EMV). Embodiments provide transformative techniques to defend payment at kiosks and fuel pumps. The ease of integration provides an avenue for adoption that will not only help to reduce fraud and loss for consumers and fuel stations, but can also reduce lost fuel tax revenues to states and the export of stolen diesel to embargoed nations.

Figure 5:
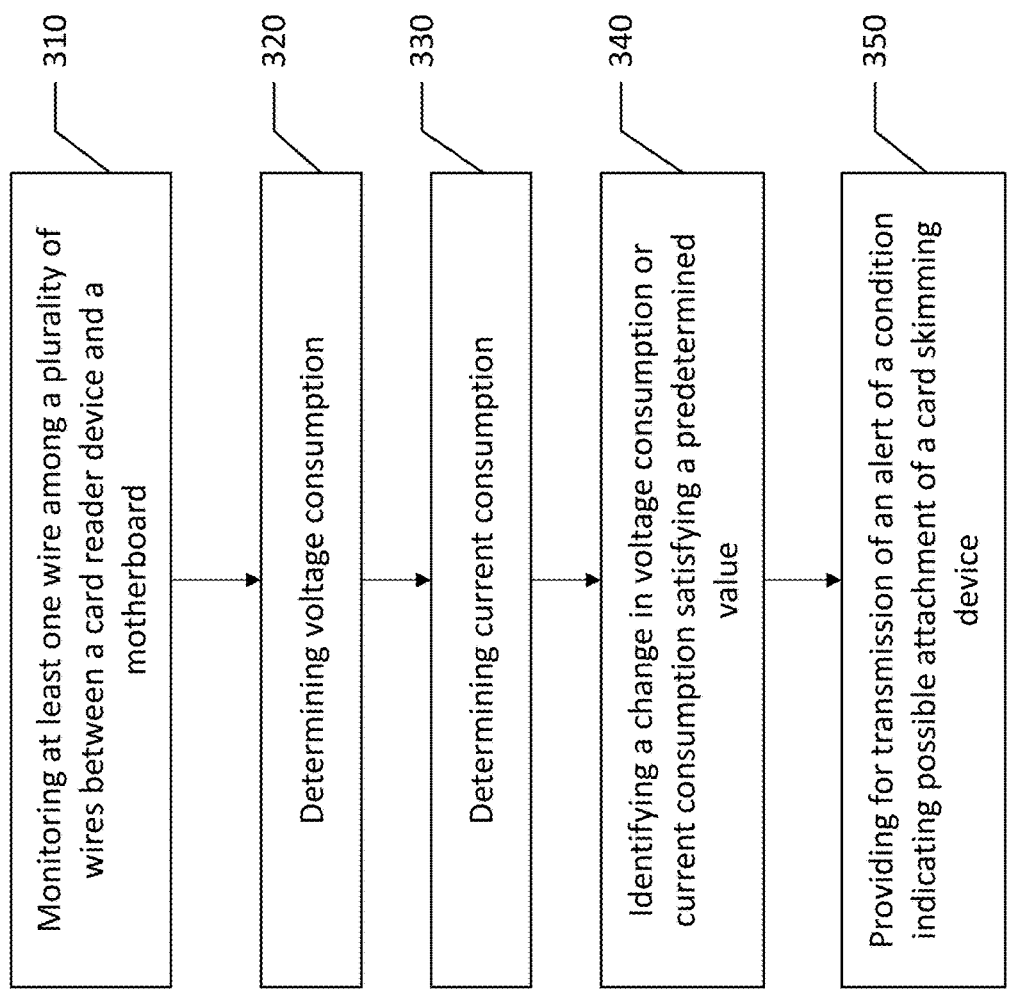
FIG. 5 is a flowchart of a method for detecting a condition indicative of an attempt to attach a card skimming device to a payment device according to an example embodiment of the present disclosure.

FIG. 5 illustrates a flowchart of a method for detecting conditions associated with the potential attachment of a card skimming device to a payment device. As shown at 310, at least one wire among a plurality of wires between a card reader device and a motherboard, such as ribbon cable 115. The monitored wire(s) may include, for example, a power wire providing voltage from the motherboard 110 to the card reader 120 and a common ground wire, for example. Voltage consumption is determined at 320 and current consumption is determined at 330. At 340, any change in voltage consumption or current consumption is identified that satisfies a predetermined value. This process determines if there is a condition that is indicative of an attempt to attach a credit card skimming device to the payment device. The process may identify unstable voltages, current or voltage drops, or substantial signal noise, any of which may provide an indication that a credit card skimming device has been attached. At 350, transmission of an alert of a condition indicating possible attachment of a card skimming device is provided, such as by communications module 175 of the tripwire 150.

As described above, FIG. 5 illustrates a flowchart of a method according to an example embodiment of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 24 of an apparatus employing an embodiment of the present invention and executed by the processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIG. 5 above may comprise a processor (e.g., the processor 22) configured to perform some or each of the operations (310-350) described above. The processor may, for example, be configured to perform the operations (310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 may comprise, for example, the processor 22 and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for detecting card skimming devices comprising:
a first terminal configured to connect to a voltage wire between a payment card reader and a motherboard containing payment card reading circuitry;
a second terminal configured to connect to a ground wire between the payment card reader and the motherboard;
a controller configured to monitor at least one of voltage or current between the voltage wire and the ground wire, wherein the controller is configured to generate an alert in response to identifying at least one voltage or current condition indicative of an attempt to attach a card skimming device at the payment card reader or between the payment card reader and the motherboard; and
a communication module configured to transmit the alert to a remote entity.

2. The device of claim 1, wherein the controller is further configured to generate a status message periodically, wherein the communication module is configured to transmit the status message to the remote entity.

3. The device of claim 1, wherein the at least one voltage or current condition indicative of an attempt to attach a card skimming device at the payment card reader or between the payment card reader and the motherboard comprises voltage instability exceeding a predetermined range about an anticipated voltage.

4. The device of claim 1, wherein the at least one voltage or current condition indicative of an attempt to attach a card skimming device at the payment card reader or between the payment card reader and the motherboard comprises a decrease in current satisfying a predetermined value.

5. The device of claim 1, wherein at least one of the payment card reader and the motherboard are disabled in response to the alert, wherein the payment card reader and the motherboard do not process payment in response to being disabled.

6. The device of claim 1, further comprising a visual alert to provide a visual indicator to potential users of the payment card reader.

7. A method of detecting card skimming devices comprising:
monitoring at least one wire among a plurality of wires between a card reader device and a motherboard;
determining voltage consumption between a voltage wire between the payment card reader and the motherboard and a ground wire between the payment card reader and the mother board;
determining current consumption between the voltage wire between the payment card reader and the motherboard and the ground wire between the payment card reader and the mother board;
identifying a change in voltage consumption or current consumption satisfying a predetermined value; and providing for transmission of an alert of a condition indicating possible attachment of a card skimming device.

8. The method of claim 7, further comprising:
generating a status message periodically and transmitting the status message to a remote entity.

9. The method of claim 7, wherein the change in voltage consumption or current consumption satisfying the predetermined value comprises a voltage instability exceeding a predetermined range about an anticipated voltage.

10. The method of claim 7, wherein the change in voltage consumption or current consumption satisfying the predetermined value comprises a decrease in current satisfying the predetermined value.

11. The method of claim 7, further comprising:
disabling at least one of the card reader device and the motherboard in response to the condition indicating possible attachment of a card skimming device.

12. The method of claim 7, further comprising:
providing a visual alert to potential users of the card reader device alerting the potential users of the condition indicating possible attachment of a card skimming device.

13. A system for detecting card skimming devices comprising:
a hub; and
a card skimming detection device comprising:
a first terminal configured to connect to a voltage wire between a payment card reader and a motherboard containing payment card reading circuitry;
a second terminal configured to connect to a ground wire between the payment card reader and the motherboard;
a controller configured to monitor at least one of voltage or current between the voltage wire and the ground wire, wherein the controller is configured to generate an alert in response to identifying at least one voltage or current condition indicative of an attempt to attach a card skimming device at the payment card reader or between the payment card reader and the motherboard; and
a communication module configured to transmit the alert to the hub, wherein the hub communicates the alert to a service provider.

14. The system of claim 13, wherein the card skimming detection device is one of a plurality of card skimming detection devices, wherein each of the plurality of card skimming detection devices are in communication with the hub via a short range communication protocol.

15. The system of claim 13, wherein the controller is further configured to generate a status message periodically, wherein the communication module is configured to transmit the status message to the hub.

16. The system of claim 13, wherein the at least one voltage or current condition indicative of an attempt to attach a card skimming device at the payment card reader or between the payment card reader and the motherboard comprises voltage instability exceeding a predetermined range about an anticipated voltage.

17. The system of claim 13, wherein the at least one voltage or current condition indicative of an attempt to attach a card skimming device at the payment card reader or between the payment card reader and the motherboard comprises a decrease in current satisfying a predetermined value.

18. The system of claim 13, wherein at least one of the payment card reader and the motherboard are disabled in response to the alert, wherein the payment card reader and the motherboard do not process payment in response to being disabled.

19. The system of claim 13, further comprising a visual alert to provide a visual indicator to potential users of the payment card reader.

20. The system of claim 19, wherein the visual alert comprises a Light Emitting Diode (LED).

\* \* \* \* \*